Patented Nov. 6, 1923.

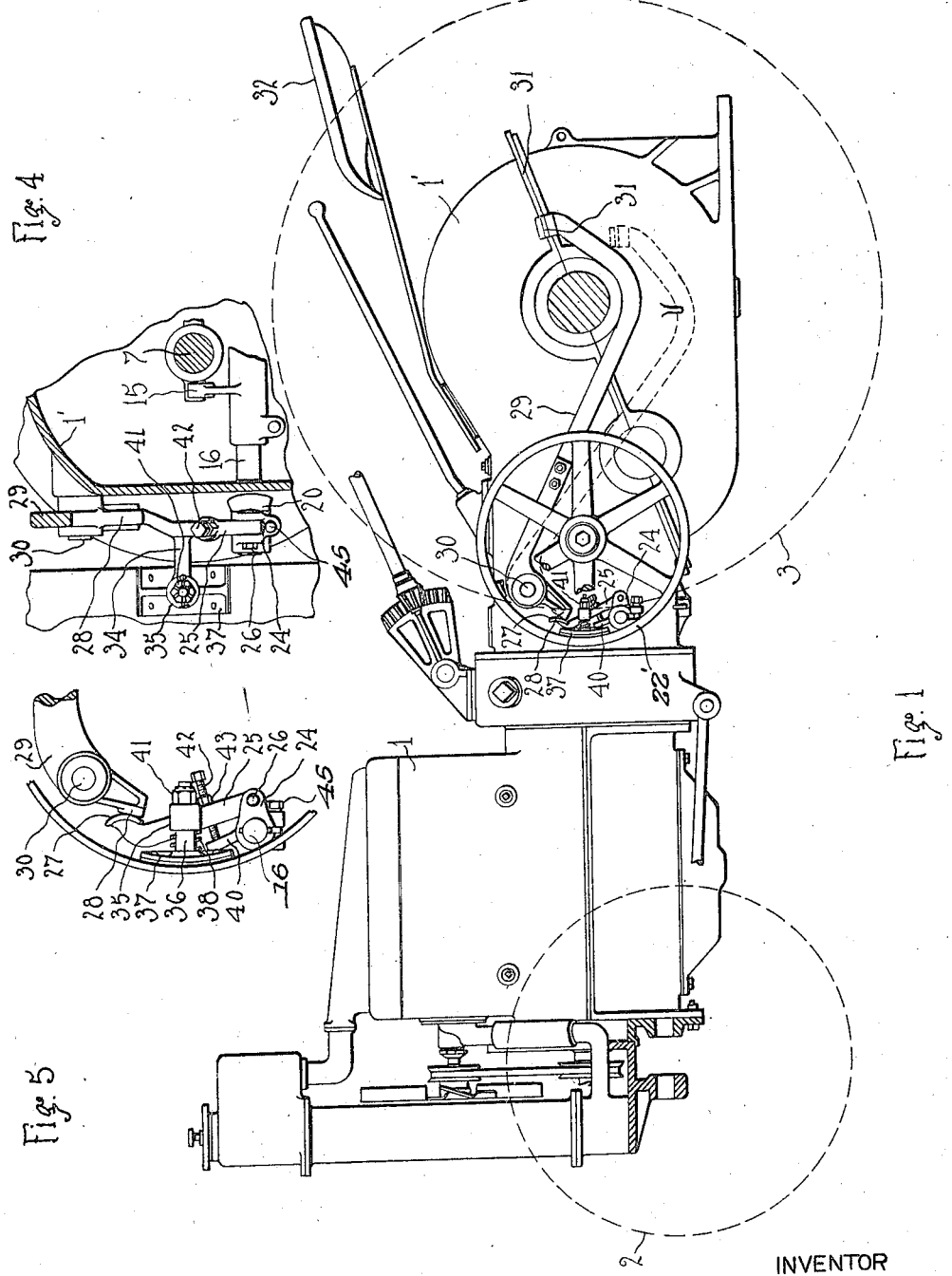

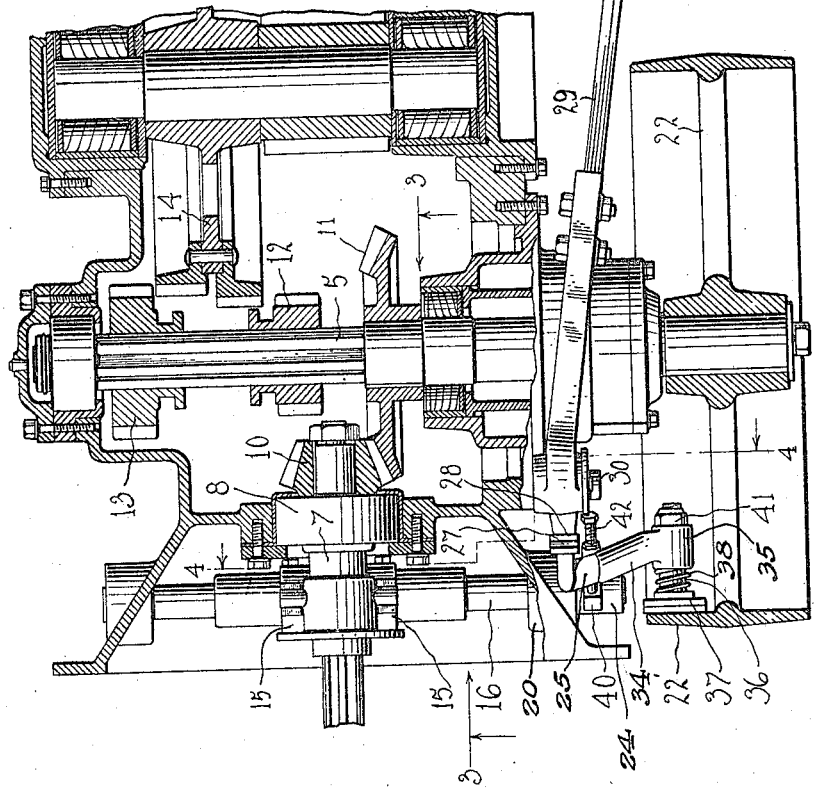

1,473,115

UNITED STATES PATENT OFFICE.

ARTHUR C. MASON, OF FLINT, MICHIGAN, ASSIGNOR TO GENERAL MOTORS CORPORATION, OF DETROIT, MICHIGAN, A CORPORATION OF DELAWARE.

BRAKE AND CLUTCH MECHANISM.

Application filed March 22, 1920. Serial No. 367,933.

*To all whom it may concern:*

Be it known that I, ARTHUR C. MASON, a citizen of the United States, and a resident of Flint, county of Genesee, and State of Michigan, have invented certain new and useful Improvements in Brake and Clutch Mechanism, of which the following is a full, clear, concise, and exact description, such as will enable others skilled in the art to which the invention relates to make and use the same, reference being made therein to the accompanying drawings, which form a part of this specification.

The present invention relates to self-propelled vehicles, particularly tractors and implements of the tractor type, wherein an internal combustion engine forms the power plant, its main object being to simplify the brake, clutch and flywheel or belt pulley mechanism. In accordance therewith, an external combined flywheel and belt pulley is utilized also as the brake drum, and a single lever is so associated therewith as to control the application of the brake and the connection and disconnection of the speed changing gearing with or from the engine.

Another object is to properly correlate the brake operating parts with those controlling the clutch so that a limited and gradual application of the brake may take place before the clutch becomes disconnected; the invention also provides for convenient adjustment of the one set of operating parts in reference to the other.

Another object is to improve the construction of the brake operating devices.

Other improvements in the several parts will be more fully pointed out hereinafter.

In the drawings, Fig. 1 is a side elevation, parts being broken away or omitted, showing a preferred embodiment of the invention. Fig. 2 is a horizontal sectional view through the front end portion of the transmission casing, showing the relation of the brake to the belt pulley. Fig. 3 is a view on a smaller scale on the line 3—3 of Fig. 2, showing the clutch operating device. Fig. 4 is a section on line 4—4 of Fig. 2. Fig. 5 is a fractional side view corresponding to Fig. 4.

The particular tractor frame shown in the present instance is formed by the engine casing 1 and the transmission casing 1′ which are bolted together and extend across from the front wheels 2 to the rear or driving wheels 3. The crank shaft appears at 4 and is arranged to be connected to or disconnected from a main transverse countershaft 5 through the medium of the clutch 6, shaft 7 (supported in a bearing 8 mounted in a cross wall 9) bevel pinion 10, and bevel gear 11 keyed on the transverse shaft 5. The latter also carries slidable gears 12—13 adapted to drive the built up gear 14 which is constantly connected to the rear axle. The clutch 6 may be of any suitable construction, that shown being of the disc type, the parts of which are normally spring-coupled together when the yoke or lever arm 15 and yoke or rock shaft 16 are permitted to swing clockwise, Fig. 3, as is usual in such constructions, and being free from one another when said yoke and shaft 16 are manually swung to the limit of their movement in the opposite direction. The shaft 16 has its end carried in a boss 20 on the transmission casing 1′, Fig. 4, from which it projects on the outer side. The shaft 5 likewise projects from the transmission casing, and keyed thereon is a combined flywheel, belt-pulley and brake-drum 22, the rim 22′ of which preferably runs close to the projection of the rock shaft 16, Fig. 2.

In the operation of tractors it is highly desirable that the engine be disconnected from the speed changing mechanism when the brake is fully applied, and for the purpose of insuring this operation through the medium of a single control lever I prefer the devices best shown in Figs. 4 and 5, although other equivalent constructions might be used. Referring thereto, it will be seen that the projecting end of the rock shaft 16 has keyed thereon an arm 24 to which the brake lever 25 is pivoted at 26. This lever is provided with a curved surface 27 for engagement with the end 28 of a foot lever 29, preferably of flat stock, which is pivoted to the transmission casing at 30 and which extends backwardly below the axle to form a pedal 31 for the foot of a driver on a seat 32. Projecting laterally from the lever 25 is an arm 34 that terminates in a guide boss 35 wherein the spindle 36 of a brake shoe 37 is slidable, under the influence of a spring 38, toward the inner or braking surface of the pulley or brake drum, this movement preferably being radial to said surface. Therefore, when pressure is applied to the pedal 31, the lever 25 tends to turn counterclockwise, Fig.

5, about the pivot 26 to resiliently press the brake shoe against the associated surface. A nut 41 provides for relative adjustment between the arm 25 and the brake shoe. The construction just described would serve for actuating the brake, and the clutch might obviously be operated independently thereof.

In order, however, to insure proper correlation between the brake and the clutch, as well as to enable them both to be operated by the foot pedal, I preferably provide the member 24 with the extension 40 at an obtuse angle thereto and thread the lever 25 to receive the screw 42 which may be locked in adjusted position by the nut 43, so that the first action, as the lever 29 is depressed, is to resiliently apply the brake, after which the screw 41 strikes the extension 40 and causes the clutch 6 by a delayed action to set the shaft 7 free from the crank shaft 4. When the pedal is released the clutch spring together with the spring 38 causes a reversal of this operation, automatically connecting the shaft 7 to the engine and freeing the brake shoe from the pulley 22. In order to permit ease of assembly and removal of parts, the arms 15—24 may be in the form of split castings which may be tightened on the shaft 16 by the bolts 44—45 as shown.

The device described are inexpensive, positive in operation, easily accessible for adjustment or repair, and afford a simplified control of the operating parts. The use of the belt pulley as a brake drum, moreover, reduces weight and provides an unusually rugged construction. The actual construction of the several elements is, of course, susceptible of variation, and I do not, therefore, wish to be limited except as indicated by the subjoined claims.

I claim:

1. A self propelled vehicle including a main frame embodying an engine casing and a transmission casing rigidly connected together, a crank shaft in the engine casing, a main shaft, a clutch for connecting the main shaft to the crank shaft at will, an oscillating clutch operating shaft for operating said clutch, a flywheel external to the transmission casing and driven by the main shaft, brake means associated with said flywheel and supported by said clutch operating shaft, and a single lever for operating both the brake means and the clutch operating shaft aforesaid whereby the clutch is actuated to disconnect said shafts as the brake is applied to the flywheel.

2. In a self propelled vehicle, a transmission gearing, a casing therefor, a countershaft projecting therefrom, a belt pulley on said countershaft externally of the casing, a rock shaft housed in the casing and projecting therefrom adjacent the rim of the belt pulley, an arm fixed to the projecting end of the rock shaft, a brake lever pivoted on the arm, a brake shoe guided by said lever for movement toward and from the rim of the pulley, a spring tending to swing the lever away from the rim, a clutch within the casing for controlling said gearing and operable by the rock shaft, the parts being so proportioned and arranged that the brake is first pressed gradually and increasingly against said rim as said lever is swung about the pivot without disconnecting the clutch and so that the clutch is thereafter disconnected by a further movement of said lever.

3. In a self propelled vehicle, a transmission casing, an oscillating clutch operating shaft and a countershaft projecting from said casing, a belt pulley carried by the countershaft externally of the casing, a lever arm carried by said clutch operating shaft and located externally of the casing and close to the inner surface of the rim of said belt pulley, and through which lever said clutch operating shaft may be operated, a brake shoe movable by the lever into engagement with the inner surface of said rim, and a clutch located within said casing and operated by said clutch operating shaft.

4. In combination with a transmission casing, a transmission gearing therein including a countershaft which projects from the casing, a main shaft, a clutch within the casing through which said gearing as a whole is driven from the main shaft, a belt pulley on the projecting end of the countershaft serving as a brake drum, a rock shaft projecting from the casing for operating the clutch, a spring pressed brake carried by said rock shaft and movable toward the rim of the belt pulley independently of the rock shaft to gradually press the brake against the pulley through a spring and which spring permits a limited application of the brake before the clutch is actuated by the rock shaft to free the gearing from the main shaft and tends to cause the clutch to again connect the gearing to the main shaft before the brake is released, operating means for said brake, and means whereby said rock shaft is operated by said brake operating means.

5. In a self propelled vehicle having a rear axle, an engine, a transmission casing having change speed gearing therein, a clutch for connecting said gearing to the engine and for disconnecting it therefrom at will, an external belt pulley and brake drum associated with said gearing, a brake for gripping said drum, and a single lever extending backwardly below the rear axle for operating said brake and clutch.

In testimony whereof I affix my signature.

ARTHUR C. MASON.